United States Patent [19]

Annen et al.

[11] 4,443,727
[45] Apr. 17, 1984

[54] DEFORMABLE ROTOR FOR A HYDROELECTRIC MACHINE

[75] Inventors: Heinz Annen, Hägglingen; Friedrich Schneebeli, Oberengstringen; Helmut Pirchl, Zurich, all of Switzerland

[73] Assignee: Escher Wyss Limited, Zurich, Switzerland

[21] Appl. No.: 384,258

[22] Filed: Jun. 2, 1982

Related U.S. Application Data

[63] Continuation of Ser. No. 226,538, Jan. 19, 1981, abandoned.

[30] Foreign Application Priority Data

Feb. 20, 1980 [CH] Switzerland ............... 1362/80

[51] Int. Cl.³ ............................................. F16F 15/12
[52] U.S. Cl. ............................ 310/261; 74/572; 310/265
[58] Field of Search ............... 310/265, 267, 261, 269, 310/51, 67, 81, 265, 261; 73/66, 468; 29/159.01, 159 R; 74/572

[56] References Cited

U.S. PATENT DOCUMENTS

| | | | |
|---|---|---|---|
| 3,046,426 | 7/1962 | Gynt | 310/265 |
| 3,271,607 | 9/1966 | Slotnick et al. | 310/269 |
| 3,470,404 | 9/1969 | Agerman et al. | 310/269 |
| 4,036,080 | 7/1977 | Friedericy et al. | 74/572 |
| 4,186,623 | 2/1980 | Freiedericy et al. | 74/572 |
| 4,263,819 | 4/1981 | Poubeau | 73/468 |

*Primary Examiner*—J. D. Miller
*Assistant Examiner*—D. L. Rebsch
*Attorney, Agent, or Firm*—Robert A. Ostmann

[57] ABSTRACT

The rotor forms part of a tubular turbine with a ring-shaped electrical machine. The rim of the rotor is deformed by the centrifugal forces, with large dimensions involved. Those portions of the rim which are to be circular at operating speed are, in the state of rest, produced to deviate from the circular by the amounts of deviation occurring in the rotating state relatively to the state of rest.

2 Claims, 10 Drawing Figures

DEFORMABLE ROTOR FOR A HYDROELECTRIC MACHINE

CROSS-REFERENCE TO RELATED APPLICATION

This application is a continuation of application Ser. No. 226,538, filed Jan. 19, 1981, is now abandoned.

BACKGROUND OF THE INVENTION

The invention relates to a rotor for a hydroelectric machine of large dimensions having a central hub, radially disposed blades and a rim which connects the outer ends of the rotor blades.

A rotor of this kind for a hydroelectric machine is known from U.S. Pat. No. 4,123,666. In the rotating state, constraining forces occur between the rim and the blades in a rotor of this kind, so that high stresses occur and the rim loses its circular form.

U.S. Pat. No. 4,129,786 shows a rotor for a hydroelectric machine wherein the blades engage in the rim in radially mobile and pivotable manner, so that the blades cannot transmit constraining forces to the rim. But as a result concentricity between rim and hub is weakened.

SUMMARY OF THE INVENTION

The invention has as its object to achieve a circular configuration for the desired rim portions in the rotating state, and at least to reduce constraining forces if appropriate in addition.

In a rotor of the kind initially described, this object is achieved according to the invention in that those portions of the rim which are to have a circular form in a given rotating state obtaining at a specific rotational speed and with a specific temperature distribution, are constructed for the state of rest obtaining with the rotor stationary under workshop temperature conditions in such a manner as to deviate from the circular by the amounts of deviation occurring in the rotating state as compared with the state of rest.

In the event of the blades being radially positively connected to the rim and to the hub, it is advantageous if the blades are under compressive preload in the radial direction in the state of rest of the rotor.

But it may also be advantageous if the deviation from the circular is achieved by constructing the rim in this deviating form.

If the rim comprises poles set radially on it, it is advantageous if those surfaces of the poles which with the stator of the electric machine define the air gap of the electric machine, are at different spacings from the axis of the rotor in the state of rest.

It may be advantageous if the rim is made from a number of segments corresponding to the number of rotor blades or a multiple thereof.

Advantageously there can be arranged at the contact zones of the segments connecting elements which bend the segments.

It may be advantageous to connect the segments to one another in pivotable manner in succession to one another.

BRIEF DESCRIPTION OF THE DRAWING

The drawings with the help of which the invention is explained in more detail show in simplified manner constructional examples of the subject of the invention. In these drawings.

DESCRIPTION OF THE PREFERRED EMBODIMENTS

Figure 1:
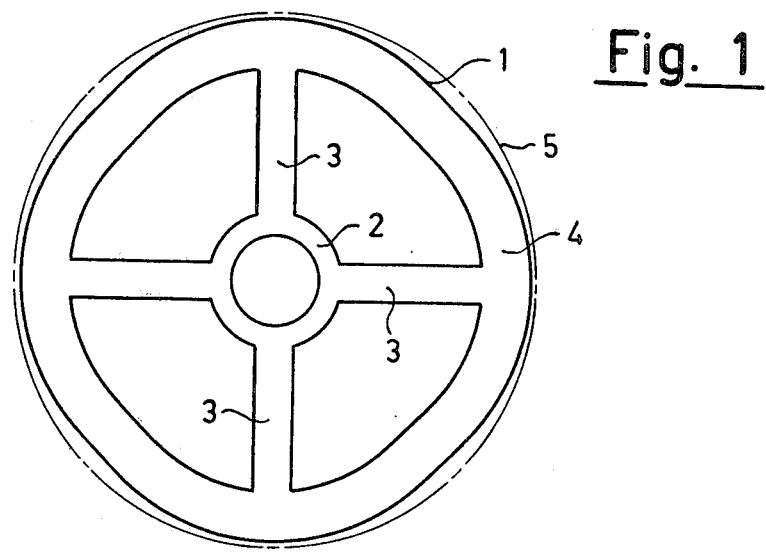
FIGS. 1 and 2 show diagrammatic views, of two different rotors.

The rotor 1 shown in FIG. 1 belongs to hydroelectric machine of large dimensions, with a turbine through which service water flows in the axial direction, and with an electric machine which is arranged in a ring about the runner of the hydraulic machine. The rotor 1 comprises a central hub 2, radially disposed blades 3, and a rim 4 which connects the outer ends of the blades 3.

Those portions of the rim 4 which are to have a circular course in the case of a given rotating state obtaining at a specific rotational speed and a certain temperature distribution, are formed of the outer periphery of the rotor 1 in the constructional example. The rotor 1 is illustrated in the state of rest. The dot-dash line 5 shows the circular position of the outer periphery of the rotor 1 in the rotating state of the said rotor. For the illustrated state of rest which obtains with the rotor stationary, at workshop temperature, the peripheral portions of the rim 4 are constructed to differ from the circular form by the amount of the differences or deviations which occur in the rotating state (at individual portions of the periphery) relatively to the state of rest. By deviation there is understood the deviation from the circular without taking into account the enlargement of the rotor generally.

Since the blades 3 of the rotor according to FIG. 1 are radially positively connected to the rim 4 and to the hub 2, they delay those portions of the rim 4 which are situated at the outer ends of the blades when migrating outwardly as a result of centrifugal force, whereas the remaining portions of the rim 4 can migrate outwardly freely.

The forementioned deviations occurring in the rotating state as compared to the state of rest can be ascertained by calculation or by experiment, for example by finding out what shape is adopted in the rotating state by a rim which is circular in the state of rest. The rim 4 can then be manufactured in the appropriate deviating form, and then has the form shown in FIG. 1. But it is circular in the rotating state.

Figure 2:
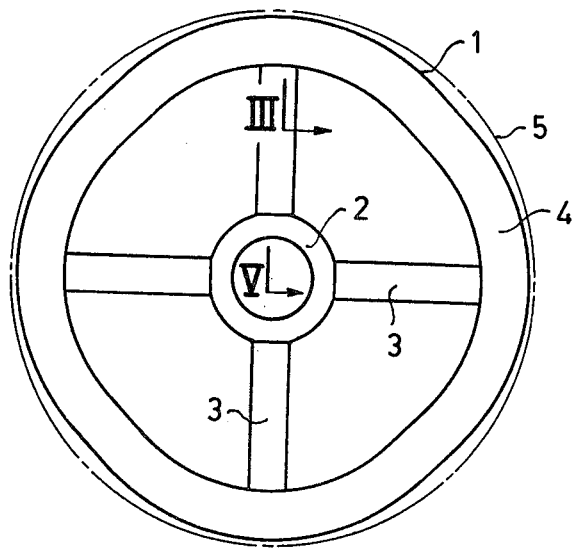
Figure 3:
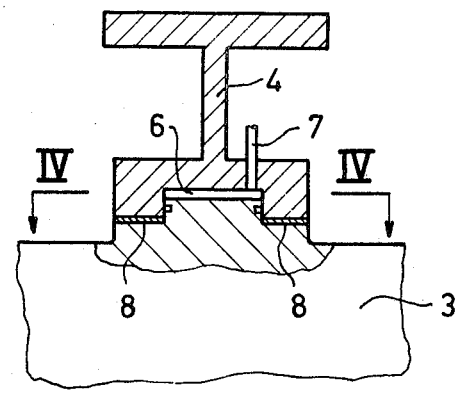
FIG. 3 shows a section taken on the line III—III in FIG. 2 on a larger scale.
Figure 4:
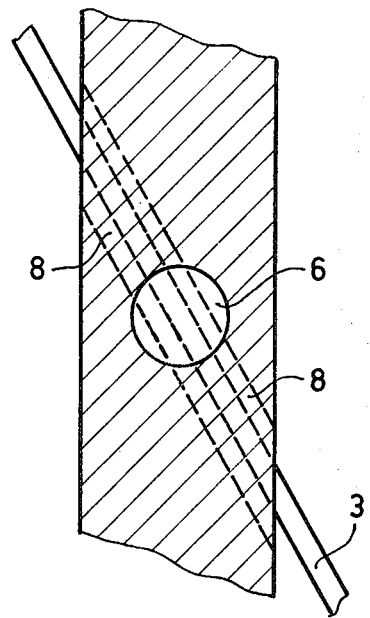
FIG. 4 shows a section taken on the line IV—IV of FIG. 3.

In the rotor shown in FIG. 2 the rim 4 is manufactured with a circular form, and the blades 3 are under compressive preload in the radial direction. As shown in detail in FIGS. 3 and 4, the blades 3 are set by means of a preloading arrangement 6 between the hub 2 and the rim 4. The preloading arrangement 6 has a pressure chamber for a pressure medium introduced through a conduit 7, said chamber being formed between the rim 4 and the respective blade 3. Wedges or keys 8 inserted between the rim 4 and the blades 3 hold the blades 3 at the desired compressive preload.

The amount of compressive preload is so selected that in the given rotating state the outer ends of the blades 3 have neither a compressive nor a tensile effect on the rim 4. The inner diameter of the rim 4 is produced in such a manner that during rotation of the rim alone is it equal in size to the outer diameter of the unit which comprises hub 2 and blades 3 and which rotates as an integral assembly. In the rotating state the rotor 1 is free of constraining stresses, and thus is in a very advantageous stress condition.

Figure 5:
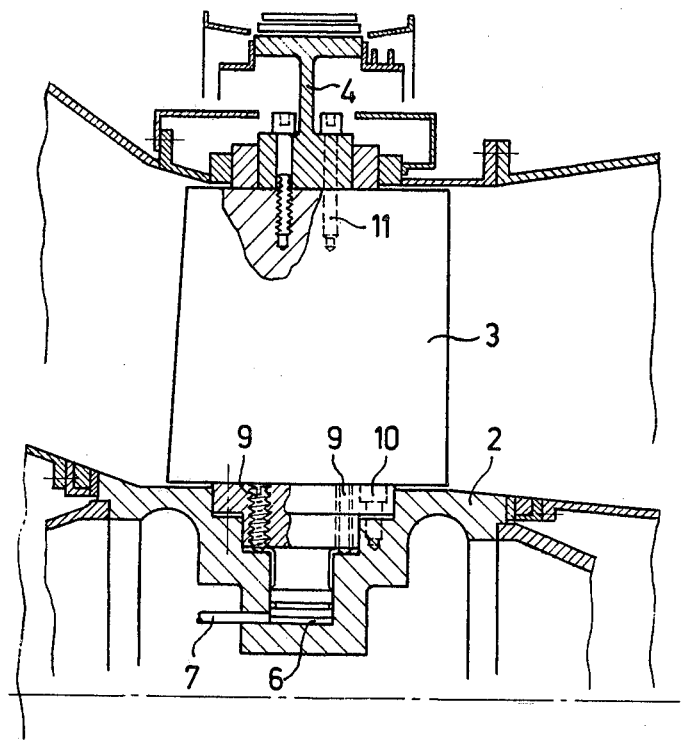
FIG. 5 shows a section taken on the line V—V in FIG. 2 on a larger scale for another rotor.

In the constructional example shown in FIG. 5 the preloading arrangement 6 is arranged between the hub 2 and the respective blade 3. For fixing the amount of preload, pressure screws 9 are used. Tension screws 10 are used for accepting tensile forces which will occur at rotational speeds higher than that taken as basic, and these screws hold the blades 3 securely on the hub 2. The rim 4 is held fast on the blades by tension screws 11 constructed as expansion screws.

Figure 6:
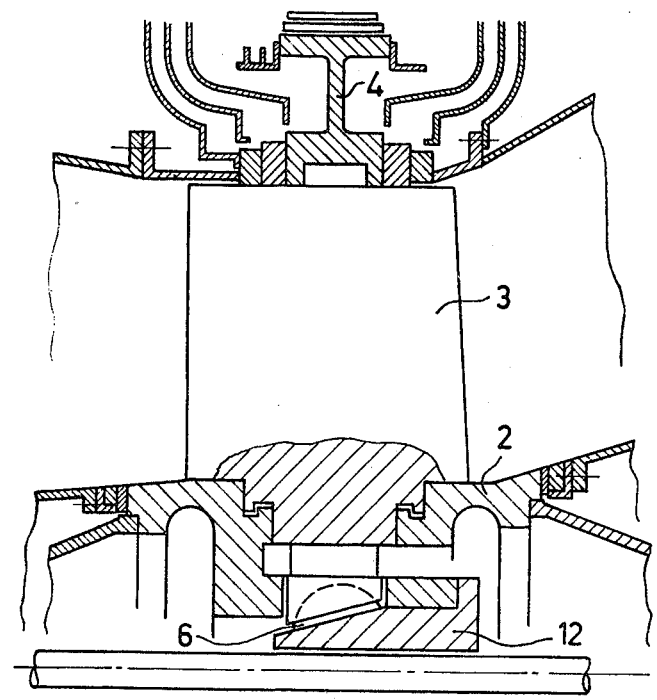
FIG. 6 shows a section as in FIG. 5 for a further rotor.

In the constructional example shown in FIG. 6 the preloading arrangement 6 comprises a central wedge 12 which forces the individual blades 3 towards the rim 4 by equal radial amounts in each case.

Figure 7:
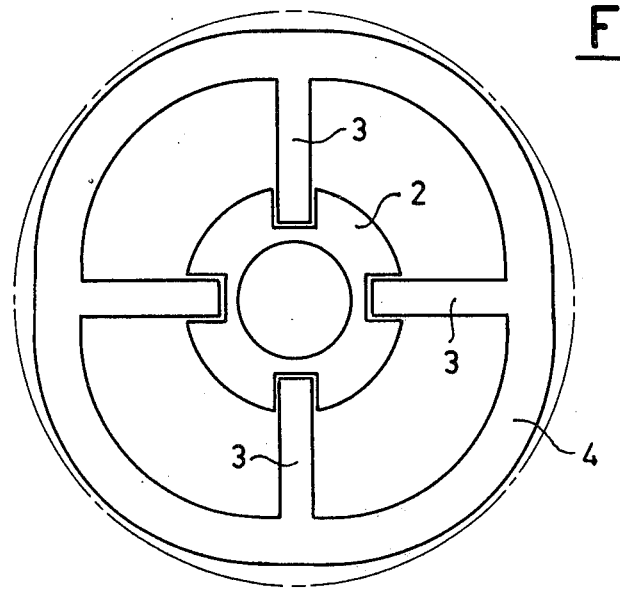
FIGS. 7 to 10 show respective diagrammatic views of further rotors.

In the rotor shown in FIG. 7 the blades 3 are connected to the hub 2 in radially displaceable manner. The rim 4 is produced in a form differing from the circular in such a way that it assumes a circular form only in the rotating state under the influence of centrifugal forces exerted on it by the blades 3.

Figure 8:
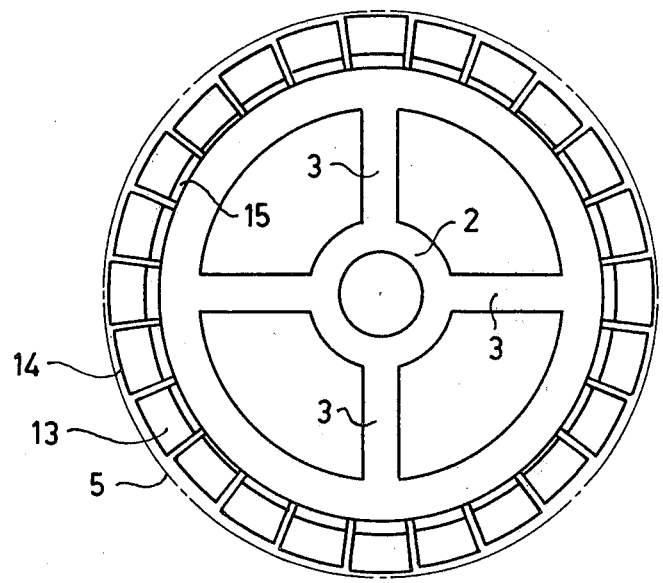

In the hydroelectric machine according to FIG. 8 the rim 4 has poles 13 applied radially thereon. The unit consisting or rim 4, blades 3 and hub 2 has in the state of rest a circular rim 4 which becomes non-circular in the rotating state. The outer surfaces 14 of the poles 13 i.e. the surfaces which with the stator of the electric machine define the air gap of the said machine, are, in the state of rest, at different spacings from the axis of the rotor. The poles are all of the same dimensions, but are secured on the rim 4 by connecting elements of different heights which comprise shims 15. In the rotating state the surfaces 14 of the poles 13 which bound the air gap extend in a circle along the dot-dash circle line 5.

Figure 9:
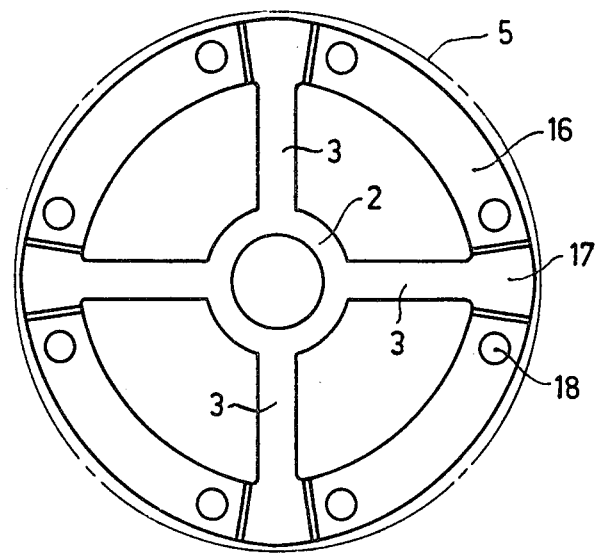

The rotor shown in FIG. 9 comprises a rim 4 assembled from segments 16,17. The rim comprises a number of segments corresponding to the number of blades or a multiple thereof, that is to say it has a total of eight segments here. The segments 16,17 are arranged in succession to one another in such manner as to be pivotable relatively to one another, as indicated by the pins 18 connecting the segments to one another. The segments 16 in the illustrated state of rest have a shallower curve than corresponds to the fully circular, and accordingly assume a circular form when in the rotating state.

Figure 10:
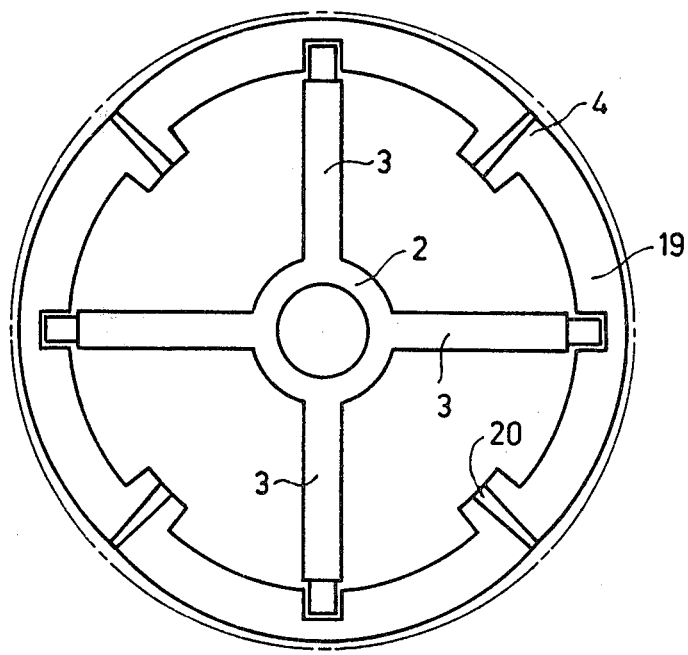

The rotor shown in FIG. 10 has a unit consisting of the hub 2 and the blades 3 which, with the outer ends of the blades 3, engages in radially mobile manner in the rim 4. The rim 4 is formed of four segments 19 which are of circular shape as individual parts. At the contacting zones of the segments 19 there are arranged wedge-shaped connecting elements 20 which have a bending effect on the segments, so that in the state of rest the rim 4 is non-circular. Under the influence of the contacting zones, which are heavier than the remaining rim cross-section, the rim 4 becomes circular in the rotating state.

To keep the rim free from bending forces also, the blades can be connected in articulated manner to the rim more particularly by means of a ball joint, for example in the case of the rotor shown in FIG. 2.

The various measures may also be used in combination with one another. Thus, some of the deviations from the circular can be compensated by preloading the rotor and the remainder by producing the rotor in a form differing from the circular.

We claim:

1. A rotor for a large hydroelectric machine comprising a central hub; radially extending blades; and a rim connecting the outer ends of the blades and having an outer surface portion which has a predetermined non-circular configuration when the rotor is at rest at room temperature, the deviations between said predetermined configuration and a circular configuration corresponding in magnitude and being opposite in sense to displacements of said surface portion caused by centrifugal and thermal stresses encountered during operation so that, when the rotor is in operation, said surface portion assumes a circular shape, and in which the blades are connected to the hub in radially displaceable manner, and the rim, when resting at room temperature, has a form differing from the circular in such a way that it assumes a circular form only in the rotating state under the influence of centrifugal forces exerted on it by the blades.

2. A rotor as defined in claim 1 including articulated connecting means between the outer end of each blade and the rim.

* * * * *